US008521724B2

(12) United States Patent
Tretjakov et al.

(10) Patent No.: US 8,521,724 B2
(45) Date of Patent: Aug. 27, 2013

(54) PROCESSING SEARCH QUERIES USING A DATA STRUCTURE (75) Inventors: Konstantin Tretjakov, Tallinn (EE); Luciano García-Bañuelos, Tartu (EE); Abel Armas-Cervantes, Tartu (EE); Jaak Vilo, Tartu (EE); Marlon G. Dumas, Tartu (EE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/341,488

(22) Filed: Dec. 30, 2011

(65) Prior Publication Data

US 2013/0103678 A1    Apr. 25, 2013

(30) Foreign Application Priority Data

Oct. 24, 2011    (GB) .................................... 1118333.2

(51) Int. Cl.
*G06F 7/00*    (2006.01)
(52) U.S. Cl.
USPC .......................................... 707/716; 707/723
(58) Field of Classification Search
USPC ................. 707/716, 722, 723; 370/217, 238, 370/338; 701/201
See application file for complete search history.

(56) References Cited

U.S. PATENT DOCUMENTS

| 7,177,295 | B1 * | 2/2007 | Sholander et al. | 370/338 |
|---|---|---|---|---|
| 7,584,298 | B2 * | 9/2009 | Klinker et al. | 709/238 |
| 7,787,361 | B2 * | 8/2010 | Rahman et al. | 370/217 |
| 2009/0040931 | A1 * | 2/2009 | Bast et al. | 370/238 |
| 2009/0228198 | A1 * | 9/2009 | Goldberg et al. | 701/201 |
| 2012/0254153 | A1 * | 10/2012 | Abraham et al. | 707/716 |
| 2013/0103671 | A1 | 4/2013 | Tretjakov | |

OTHER PUBLICATIONS

"Non-Final Office Action", U.S. Appl. No. 13/341,373, (Jan. 14, 2013), 8 pages.
"Notice of Allowance", U.S. Appl. No. 13/341,373, (May 6, 2013), 8 pages.

* cited by examiner

*Primary Examiner* — Hung T Vy
(74) *Attorney, Agent, or Firm* — Wolfe-SBMC (57) ABSTRACT According to an embodiment, there is provided a method of generating a data structure stored in computer memory for processing a search query in a network of interconnected nodes, wherein the method comprises selecting landmark nodes by the following steps and storing the selected landmark nodes in the data structure: sampling from the network nodes a first sample of vertex pairs, computing the shortest path for each vertex pair, each shortest path comprising a set of vertices between each vertex in the vertex pair; identifying a first landmark node which occurs in more of the shortest paths more often than any other vertex; removing from the network vertices shortest paths including the first landmark node and identifying a second landmark node which occurs in more of the remaining shortest paths than any other remaining vertex.

12 Claims, 6 Drawing Sheets

| u | $P_u[V_1] = u$ | ← 22 |
|---|---|---|
| | $P_u[V_2] = u$ | |
| | $P_u[V_3] = V_1$ | |
| | $P_u[V_4] = V_1$ | |
| | $P_u[V_5] = V_3$ | |
| | $P_u[V_6] = V_3$ | |
| | $P_u[V_7] = V_4$ | |
| | $P_u[V_8] = V_6$ | |

PROCESSING SEARCH QUERIES USING A DATA STRUCTURE

RELATED APPLICATION

This application claims priority under 35 U.S.C. §119 or 365 to Great Britain, Application No. GB 1118333.2, filed Oct. 24, 2011.

The entire teachings of the above application(s) are incorporated herein by reference.

TECHNICAL FIELD

The present invention relates to processing search queries, and in particular to generating a data structure for processing a query in a network of interconnected nodes.

BACKGROUND

Figure 1:
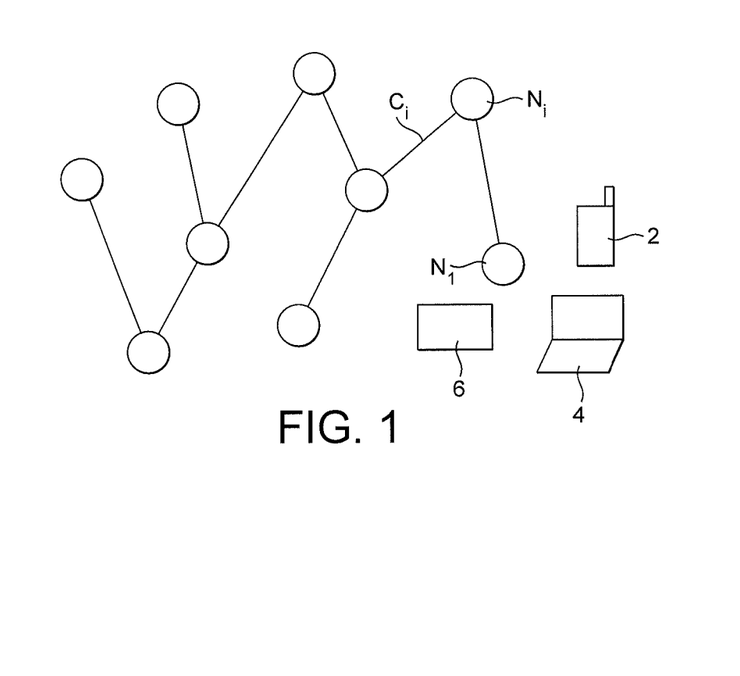
FIG. 1 is a diagram of part of a network.

There exist many situations where computer networks comprise a typically very large number of interconnected nodes. For example, the communication network of Skype represents a large social network for peer to peer communication. FIG. 1 is a schematic diagram of a small part of a typical computer network. The network is shown to comprise a plurality of nodes Ni. Each node can be associated with one or more physical computer devices as shown for example in the case of node Ni which is shown to be associated with a mobile device 2, a PC 4 and a tablet 6. Each node is associated with a single user, who in this case can register or log in with a particular network using any one of the computer devices. The nodes are shown interconnected by connections Ci. In the context of the physical network, the connections Ci can be implemented in any known way, wired or wireless. In the context of users associated with nodes, the connections do not necessarily pertain to a single physical connection in a network, but represent a relationship between users associated with the nodes at either end of the connection. As an example, in the case of Skype, two users are considered to be connected if they are in each other's contact lists. A common challenge with such networks is to allow a user to search for another user by name for example and to see the results of a search ranked in the order of their shortest path distance to him. Similarly, a user may wish to know what chain of contacts allows him to reach another user in the network. Attempts to solve the problem have used analytic techniques for finding the shortest paths between a given pair of nodes in a graph.

There exists a large body of methods to address this problem. Existing methods can be broadly classified into exact and approximate. Exact methods, such as those based on Dijkstra's traversal, are prohibitively slow for performing online queries on graphs with hundreds of millions of vertices, which is a typical size for a contemporary social network. Among the approximate methods, a family of scalable algorithms for this problem are the so-called landmark-based (or sketch-based) approaches. In this family of techniques, a fixed set of landmark nodes is selected and distances are precomputed from each vertex to some or all of the landmarks. Knowledge of the distances to the landmarks, together with the triangle inequality, typically allows one to compute approximate distance between any two vertices in $O(k)$ time, where k is the number of landmarks, and $O(kn)$ space, where n is the number of vertices in the network. Those estimates can then be used as-is, or exploited further as a component of a graph traversal or routing strategy in order to obtain an exact shortest path.

An important aspect of landmark based methods is the way landmarks are selected—a careful selection strategy can have a significant positive effect. Strategies which rely on selecting landmarks with high degree, betweeness—and closeness—centrality as well as ensuring proper dispersion of landmarks over the graph and its paths have been suggested.

Reference is made to a paper by Potamias et al entitled "Fast Shortest Path Distance Estimation in Large networks" in CIKM '09: Proceedings of the 18$^{th}$ International Conference on Information and Knowledge Management, pages 867-878 NY, USA 2009. In that paper, a landmark based distance estimation algorithm is evaluated under different landmark selection strategies. According to this paper, the highest degree and closeness centrality techniques have been shown to typically yield highest accuracy.

Although landmark-based algorithms do not provide strong theoretical guarantees on approximation quality, they have been shown to perform well in practice, scaling up to graphs with millions or even billions of edges with acceptable accuracy and response times of under one second per query.

It is an objective of the present invention to improve the accuracy over existing techniques, with acceptable computation times for generating a data structure for use in processing a search query.

SUMMARY

According to an aspect of the present invention there is provided a method of generating a data structure stored in computer memory for processing a search query in a network of interconnected nodes, wherein the method comprises selecting landmark nodes by the following steps and storing the selected landmark nodes in the data structure: sampling from the network nodes a first sample of vertex pairs, computing the shortest path for each vertex pair, each shortest path comprising a set of vertices between each vertex in the vertex pair; identifying a first landmark node which occurs in more of the shortest paths more often than any other vertex; removing from the network vertices shortest paths including the first landmark node and identifying a second landmark node which occurs in more of the remaining shortest paths than any other remaining vertex.

The invention also provides a computer program product comprising a non-transitory computer readable medium storing thereon computer readable instructions which when executed by a computer carry out the steps of the above-defined methods.

The data structure has applicability when recorded on an electronic storage medium and used in processing a search query. Another aspect of the invention provides a method of processing a search query to provide a search result, the method comprising receiving at a computer device a search query in the form of a digital message, the query identifying a source node and a target node, and executing at the computer device an application for generating a search result, the application performing the following steps: accessing the data structure generated by the above method, in which each landmark has stored therewith a shortest path tree in the form of a set of parent links wherein each parent link identifies an adjacent vertex node, for each landmark identifying the location of the source node and the target node in the shortest path trees to the landmark node, for each landmark node using the identified locations of the target node and source node to generate a measure of distance between the source node and the target node, determining the landmark with the shortest distance and providing a search result related to the shortest path tree of that landmark.

According to a first technique the measure of distance is generated by computing a first distance over the shortest path between the source node and the landmark node; computing a second distance over the shortest path between the landmark node and the target node; and summing the first and second distances.

According to a second technique, the measure of distance is generated by identifying a common ancestor node in the shortest path trees from the source node and the target node to the landmark node. In one version, this is followed by the step of summing a first distance from the source node to the common ancestor node and a second distance from the common ancestor node to the target node.

In another version, this is followed by the steps of identifying all pairs of nodes in a first path between the source node and the common parent node and a second path between the common parent node and the target node; locating any of said pairs which are edges; identifying the edge of the shortest distance; and using the edge to determine the measure of using the edge to determine measure of distance between the source node and the target node.

According to a third technique the measure of distance is generated by recording nodes in common between the shortest path trees from the source node and the target node to each landmark node; executing a graph traversal from the source node, traversing only commonly recorded nodes, to update a shortest path from the source node to the target node; and using the updated shortest path to determine the measure of distance.

Embodiments of the invention described in the following provide improvements relating to a new landmark selection strategy that seeks to maximise the coverage of all shortest paths by the selected landmarks.

Embodiments of the invention discussed in the following allow for a significantly improved execution time, for example more than four seconds on a graph with ten times less edges and one hundred times less vertexes than a Skype graph snapshot of February 2010.

For a better understanding of the present invention and to show how the same may be carried into effect reference will now be made by way of example to the accompanying drawings:

DETAILED DESCRIPTION

Figure 2:
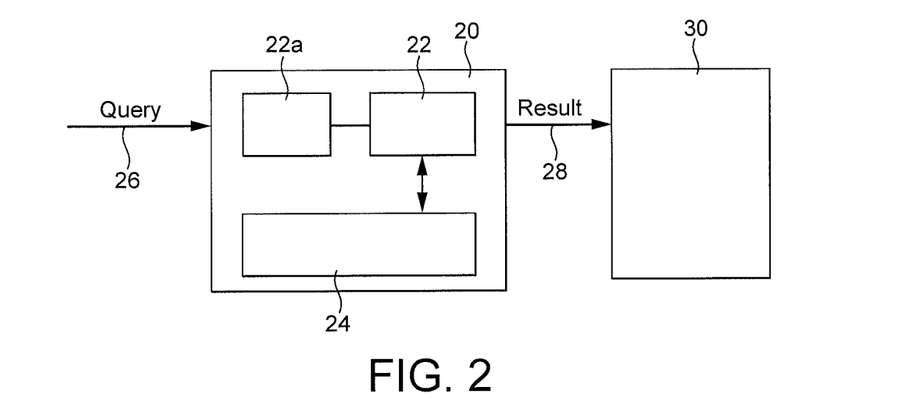
FIG. 2 is a block diagram of a system for performing a search query.

FIG. 2 is a schematic block diagram of a system for processing a search query. The system comprises a computer device 20 which implements two components. A first component 22 is a data structure which is a memory or other form of computer store holding data in the form of a graph as described further herein. The second component is a processing function 24 which accesses the data structure 22 and uses it to process a search query. In operation, a query 26 in the form of a digital message is received by the computer device 20 and the computer device 20 operates to generate a result 28. The result can be utilised in a number of different ways by a user result function 30. For example the user result function 30 can be a search function which receives other inputs along with the result 28 and generates a search result to a user. Alternatively, the user result function 30 can be a display which displays a result 28 directly to a user.

Each component 22, 24 can be implemented by a processor and a memory. It will readily be appreciated that a single processor and single memory can be used to provide both components, or the components can be provided by separate processes and separate memories. In the first component, code executed by a processor 22a generates and maintains the data structure 22, and in the second component code executed by the processor processes the search query as will be described more fully later.

The query 26 is received by the computer device 20 from a user. A user can input the query into one of the physical devices with which he is associated by any known input means. The query is supplied to the computer device 20 in the form of a digital message over any transmission mechanism. For example, where the user is associated with a client terminal, the query can be supplied through the internet to a server at which the computer device 20 is implemented. Alternatively, the query could be handled locally at a client terminal. As will become clearer in the following, the query includes an identifier of a source node, generally being a node associated with the user inputting the query, and a target node which will be the subject of the search.

An improvement over existing techniques derives from the selection of landmarks. A "greedy" approach is proposed to select these landmarks that provide the best coverage of all shortest paths in a random sample of vertex pairs.

Before describing the invention, landmark-based distance estimates techniques will first be described.

Basic Definitions

Let $G=(V,E)$ denote a graph with $n=|V|$ vertices and $m=|E|$ edges. For simplicity of exposition, we shall consider an undirected, unweighted graph, although the approach can be easily generalized to accommodate weighted directed graphs as well.

A path $\pi_{s,t}$ of length l between two vertices $s,t \in V$ is defined as a sequence $\pi_{s,t}=(s, u_1, u_2, \ldots, u_{l-1}, t)$, where $\{u_1, u_2, \ldots, u_{l-1}\} \subseteq V$ and $\{(s,u_1), (u_1,u_2), \ldots, (u_{l-1},t)\} \subseteq E$. We denote the length l of a path $\pi_{s,t}$ as $|\pi_{s,t}|$. The concatenation of two paths $\pi_{s,t}=(s, \ldots, t)$ and $\pi_{t,v}=(t, \ldots, v)$ is the combined path $\pi_{s,v}=\pi_{s,t}+\pi_{t,v}=(s, \ldots, t, \ldots, v)$.

The distance $d(s,t)$ between vertices s and t is defined as the length of the shortest path between s and t. The shortest path distance in a graph is a metric and satisfies the triangle inequality: for any $s,t,u \in V$ $$d(s,t) \leq d(s,u)+d(u,t). \quad (1)$$

The upper bound becomes an equality if there exists a shortest path $p_{s,t}$ which passes through u.

The diameter of a graph is the maximal length of a shortest path in the graph. An important property of social networks in this respect is that their diameter is small. Centrality of a vertex is a general term used to refer to a number of metrics of importance of a vertex within a graph. Betweenness centrality corresponds to the mean proportion of shortest paths passing through a given vertex. Closeness centrality measures the average distance of a vertex to all other vertices in the graph.

Landmark-Based Distance Estimation

Before describing the improved landmark selection process, the basic landmark-based distance estimation technique will be explained.

As noted in Equation 1, if we fix a single landmark node u and precompute the distance d(u,v) from this node to each other vertex v in the graph, we can get an upper bound approximation for the distance d(s,t) between any two vertices s and t:

$$d^U_{approx}(s,t) = d(s,u) + d(u,t)$$

If we now select a set $U=\{u_1, u_2, \ldots, u_k\}$ of k landmarks, a potentially better approximation can be computed:

$$d^U_{approx}(s,t) = \min_{u \in U} d^u_{approx}(s,t)$$

In principle, the triangle inequality also allows to compute a lower bound on the distance, but previous work indicates that lower-bound estimates are not as accurate as the upper-bound ones.

In the following we refer to this algorithm as LANDMARKS-BASIC (Algorithm 1)

For unweighted graph, the algorithm requires O(km) time to precompute distances using k BFS traversals and O(kn) space to store the distances. Each query is answered in O(k) time. Note that this approach only allows us to compute an approximate distance, but does not provide a way to retrieve the path itself.

Improved Landmark-Based Algorithms

Shortest Path Trees

An improvement to the above algorithm is the idea of maintaining an explicit shortest path tree (SPT) for each landmark, instead of simply storing the distances to landmarks as numbers. More precisely, let $p_u[v]$ be the next vertex on an arbitrarily chosen shortest path from a vertex v to a landmark u. We shall refer to $p_u[v]$ as the parent link of v in the SPT of u (see FIG. 3). Similarly to distances, parent links can be computed in a straightforward manner during a BFS traversal of the graph in O(m) time per landmark.

Figure 3:
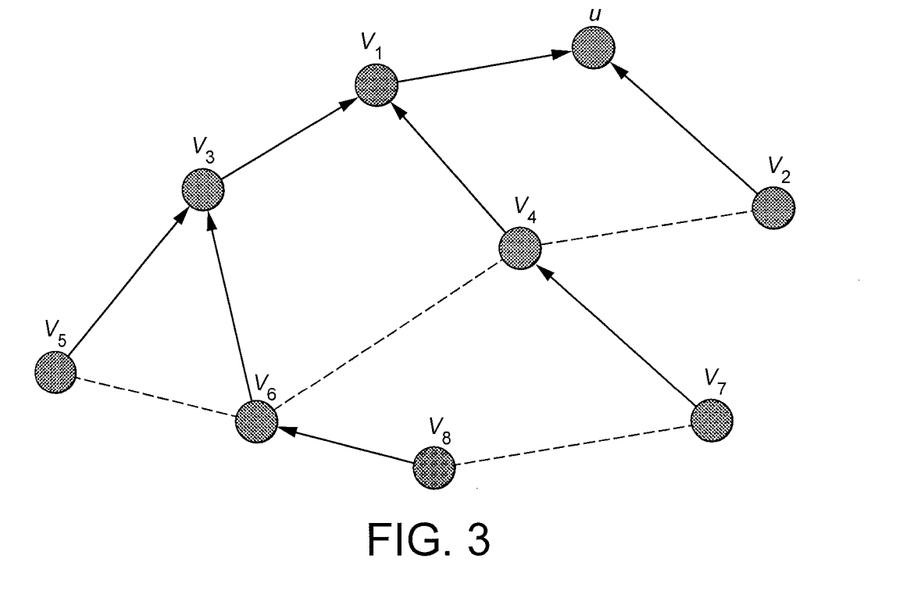
FIG. 3 illustrates a shortest path tree for one landmark.

In FIG. 3 black arrows denote parent links. Dashed lines are graph edges that are not part of the tree.

The availability of parent links enables us to recover an exact shortest path from each vertex v to each landmark u by simply following the corresponding links. For example, if the source node is $V_5$, the data set indicates $pu[V_5]=V3$; $pu[V_3]=V1$; $pu[V_2]=u$. Consequently, it also allows to compute the shortest path distance d(u,v) (in that case 3) and thus directly apply the ideas of the LANDMARKS-BASIC algorithm, with the only difference that each distance computation now requires O(D) steps, where D is the diameter of the graph. As the diameters of social network graphs tend to be small, the overhead of such a computation is minor.

Figure 4:
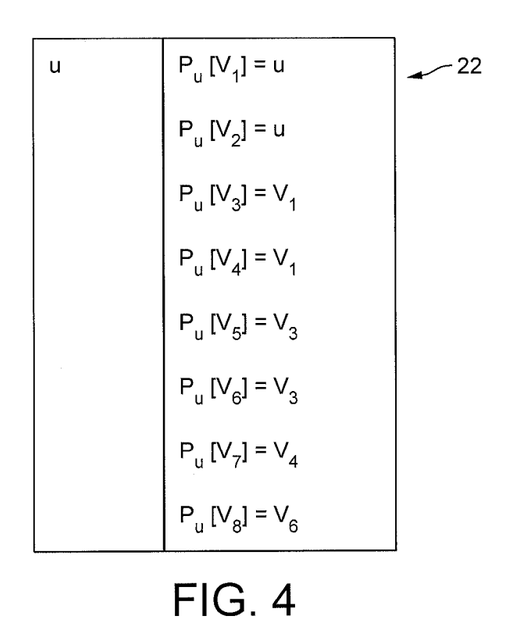
FIG. 4 illustrates a data set for one landmark.

Note that this approach allows to retrieve an actual path between any two vertices in addition to the distance approximation. FIG. 4 shows the data set for landmark u in the data structure 22. It will be appreciated that a similar data set is held for each landmark.

Lowest Common Ancestor Method

Figure 5:
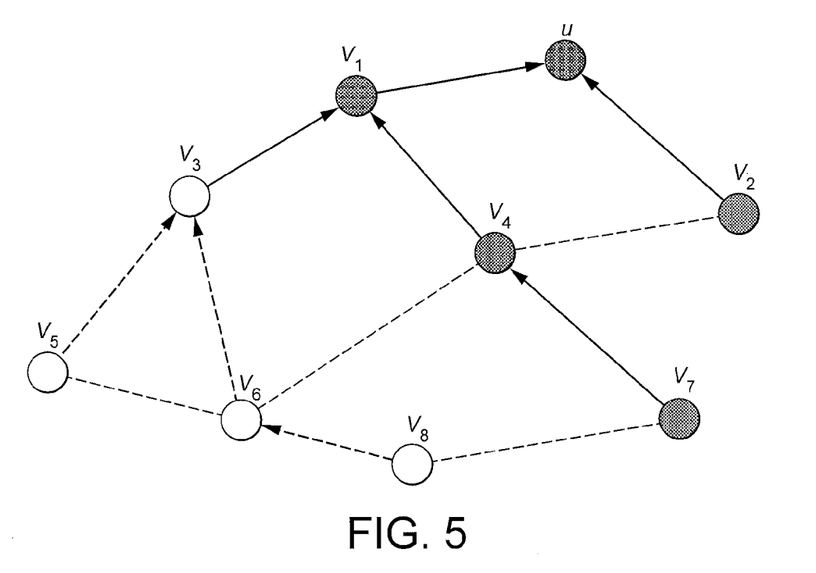
FIG. 5 illustrates a shortest path tree with a lower common ancestor.

Besides performing basic landmark-based approximation, the availability of the SPT allows us to significantly improve the upper bound estimates on distances for many vertex pairs. Consider the situation depicted in FIG. 5 and suppose we wish to approximate the distance between $v_5$ and $v_8$. By applying the basic technique we obtain an upper bound estimate of $d(v_5,v_8) \leq d(v_5,u) + d(u,v_8) = 3+4=7$. Observe, however, that once we have the explicit shortest paths:

$$\pi_{v_5,u}=(v_5,v_3,v_1,u), \pi_{v_8,u}=(v_8,v_6,v_3,v_1,u),$$

we can note that both of them pass through $v_3$ and thus the estimate $$d(v_5,v_8) \leq d(v_5,v_3) + d(v_3,v_8) = 1+2=3.$$

will result in a better upper bound. In general, whenever two shortest paths $\pi_{s,u}$ and $\pi_{t,u}$ have a common vertex $v \neq u$, we have $$d(s,t) \leq d(s,v) + d(v,t) < d(s,u) + d(u,t), \quad (2)$$

and thus if we use v instead of u to approximate d(s,t) we obtain a tighter bound. Naturally, it makes sense to select the vertex v providing the best such approximation. It can be seen that this vertex is the lowest common ancestor (LCA) of s and t in the SPT of u. When approximating distance between $v_5$ and $v_8$ we use their lowest common ancestor $v_3$ instead of the landmark u as a reference.

This observation provides the basis of an LCA approximation method (DISTANCE-LCA, Algorithm 2). By substituting this distance estimate into Equation 3, we obtain a new algorithm LANDMARKS-LCA with increased accuracy. Note that this algorithm can also be trivially extended to return the actual path.

One way to understand the extent of improvement is to note that the basic algorithm will provide exact estimates only for shortest paths that pass through the landmark vertex. In FIG. 5 those are only the paths connecting $v_2$ with $v_1$ and $v_3$. The LCA algorithm, however, will provide exact answers for all shortest paths that lie along the SPT, and there will be typically considerably more of those.

Landmarks-BFS

Figure 6:
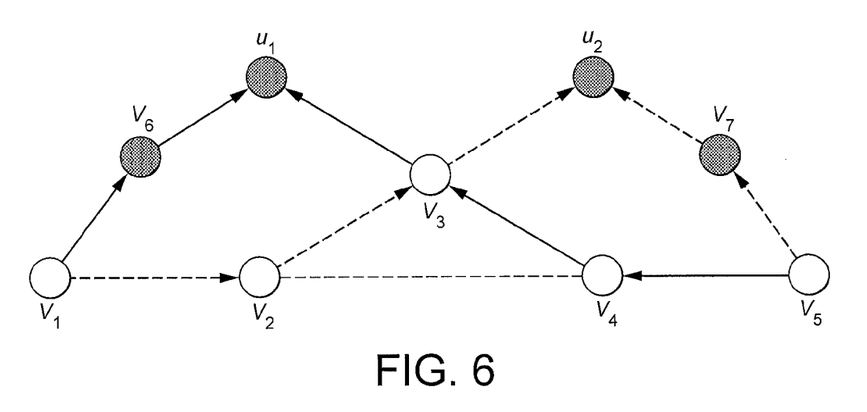
FIG. 6 illustrates a shortest path tree with edge insertion.

The algorithms LANDMARKS-BASIC and LANDMARKS-LCA use each landmark for distance approximation independently of the other landmarks. This is not the best possible use of all available landmark data. Consider FIG. 6, for example. When approximating distance between vertices $v_1$ and $v_5$, we would obtain a path of length 5 if we used the two landmarks independently. By combining the two subtrees we can find a better path of length 4.

This suggests a powerful improvement over the previous approaches. In order to approximate distance between two vertices, collect all paths from those vertices to all landmarks, and perform a usual BFS (or, in the case of weighted graphs, Dijkstra) traversal on the subgraph, induced by the union of those paths. We refer to this algorithm as LANDMARKS-BFS (Algorithm 3).

For k landmarks, the size of the subgraph will be less than 2 kD. Consequently, the memory complexity of LANDMARKS-BFS is O(kD) and the time complexity is at most $O(k^2D^2)$.

By taking other graph edges (i.e., "shortcuts") into account, in LANDMARKS-BFS we further improve the distance approximation to 3.

Shortcutting

Denote the lowest common ancestor of s and t by v. The LCA algorithm approximates $\pi_{s,t}$ by a concatenation of $\pi_{s,v}$ with $\pi_{v,t}$. However, it may happen that a vertex $w \in \pi_{s,v}$ is connected directly by an edge with a vertex $w' \in \pi_{v,t}$. In this case, an even shorter approximation to $\pi_{s,t}$ can be obtained by concatenating the paths $\pi_{s,w}$, $\pi_{w,w'}$ and $\pi_{w',t}$. For example, in FIG. 5, the edge $(v_5,v_6)$ acts as a shortcut from $\pi_{v_5,v_3}$ to $\pi_{v_3,v_8}$. If we account for this edge, we may further improve the LCA distance estimate to the true shortest path $d(v_5,v_8)=2$.

In order to locate shortcuts we can simply examine all pairs of vertices in $\pi_{s,v} \times \pi_{t,v}$ and if some of them are connected by an edge, find the edge providing the best distance estimate. This can be done in $|\pi_{s,v}| \times |\pi_{t,v}|$, i.e., at most $O(D^2)$ steps. We refer to the resulting distance approximation method as DISTANCE- SC (Algorithm 4. By using this upper bound estimate in Equation 3 we obtain the landmark-based algorithm LANDMARKS-SC.

Landmark Selection Techniques

Although landmarks can be selected uniformly at random, it has been shown by experiment that selecting landmarks with the highest degree or lowest closeness centrality typically ensures better distance estimates, whereas it is shown that the two methods provide similar accuracy. A novel landmark selection technique with improved accuracy is now described.

Best Coverage

Figure 7:
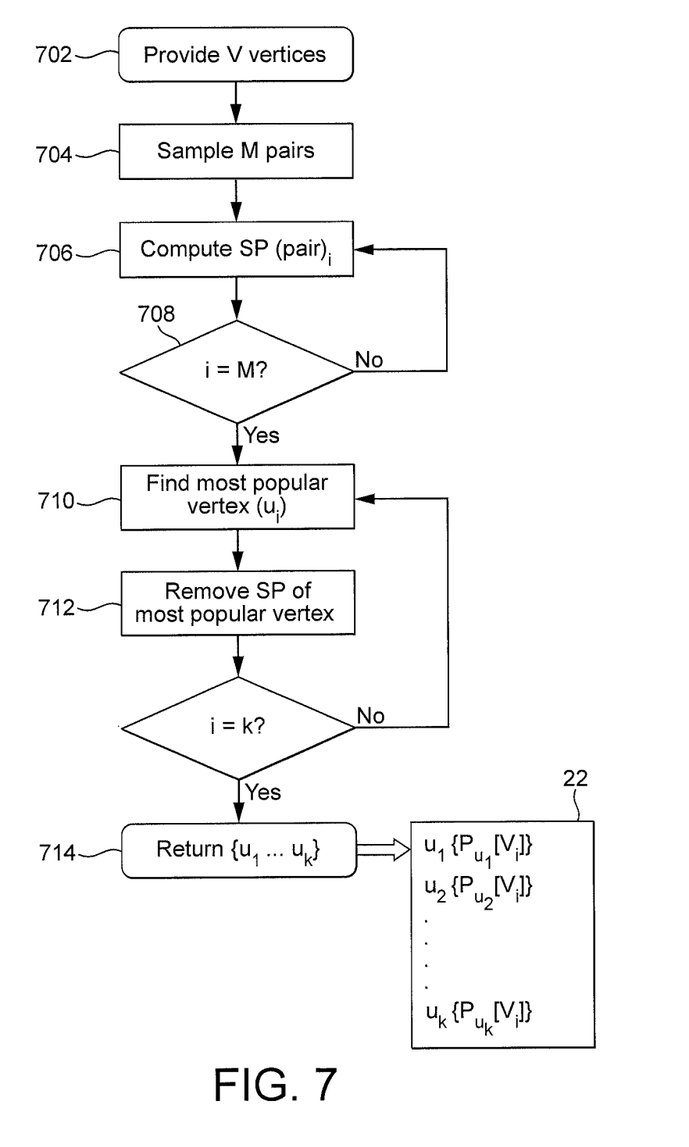
FIG. 7 is a flow chart of a landmark selection method.
Figure 8:
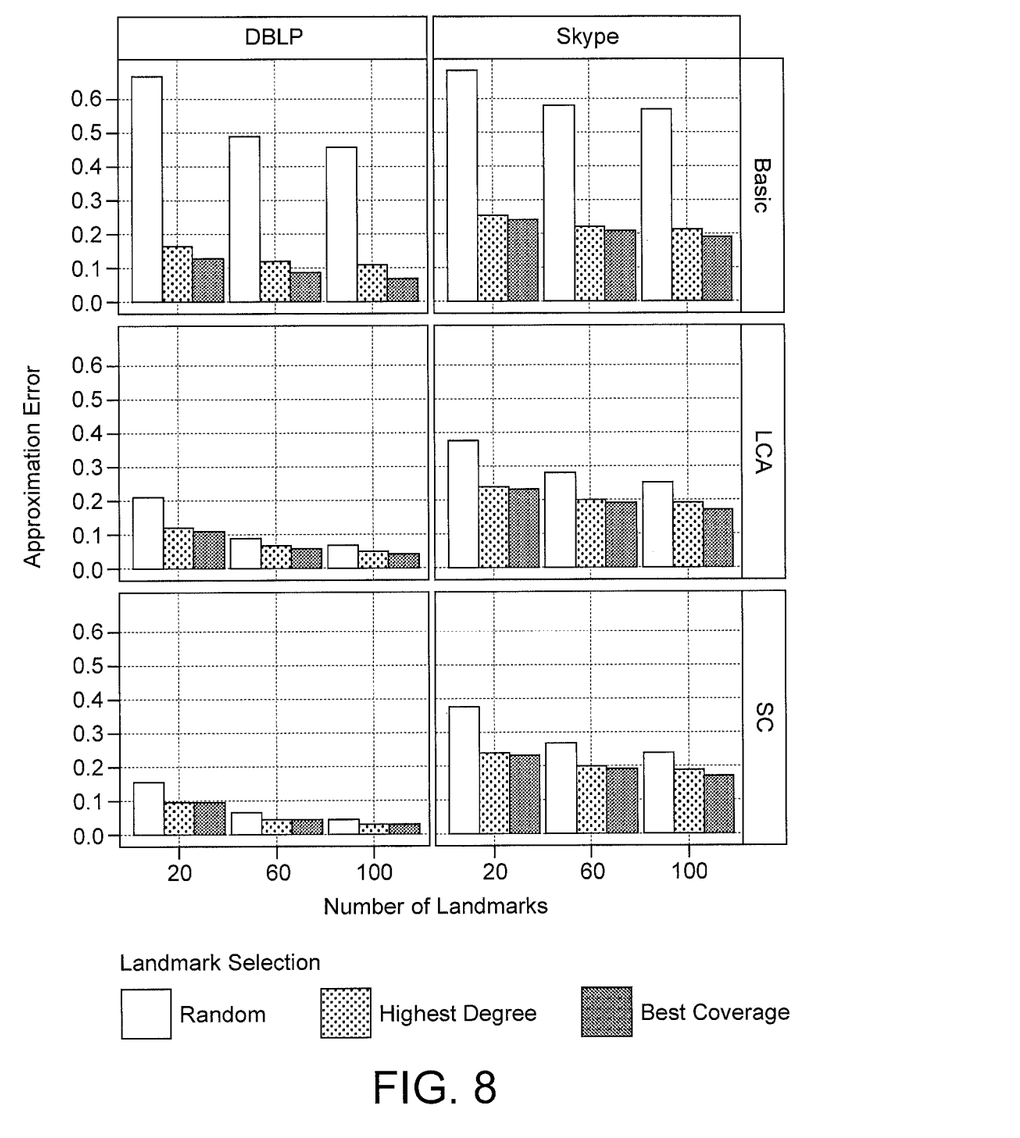
FIG. 8 is a table of experimental results.

When a landmark u lies on the shortest path between s and t, its upper bound distance estimate is exact. We say that such a landmark covers the pair (s,t). Consequently, the most desirable set of landmarks would be the one that covers as many vertex pairs as possible. A simple greedy strategy based on sampling is explained with reference to Algorithm 4, and FIG. 7. A graph G with V vertices representing the network is supplied (702). We sample (704) a set of M vertex pairs, and compute (706, 708) exact shortest path for each pair. This computation can be carried out by any known method, e.g. BSF graph traversal. As the first landmark we select (710) the vertex that is present in the greatest number of paths of the sample, i.e. the most popular vertex. We remove (712) the paths covered by that first landmark from the sample and proceed to select (by returning to 710 for i<k) the second landmark as the vertex, which covers most of the remaining paths. Subsequent landmarks in the returned (714) set $\{u_1 - u_h\}$ are determined in a similar way. The landmarks are stored in the data structure 22.

Incremental Updates

If the graph is subject to intensive edge insertion and deletion, landmarks that have been computed originally become outdated and the approximation performance deteriorates. Therefore, landmarks have to be maintained up to date. Although this can be achieved by means of daily or hourly full recomputation, such a solution is computationally expensive. Moreover, for certain applications, such as the abovementioned social search, it can be particularly important to maintain landmarks up to date at all times. Indeed, if the social search feature is relied upon by new users to establish their first list of contacts, it is important that adding a new contact would be immediately reflected in the consequent search orderings.

Fortunately, when landmarks are maintained in the form of shortest path trees with single pointers (parent links), they can be updated incrementally to accommodate edge insertions or deletions. The procedures for maintaining SPTs under insertions and deletions are known, for example see D. Frigori et al, "Fully dynamic algorithms for maintaining shortest path trees" Journal of Algorithms, Vol 34, November 2, pages 251-281 2000. In the particular case of unweighted graphs with a small diameter, they are fairly straightforward.

As an informal example, consider the SPT presented on FIG. 3. Suppose that an edge $\{u,v_8\}$ has just been inserted into the graph. The SPT update algorithm would proceed as follows. Firstly, note that the newly added edge provides a shorter path from $v_8$ to the landmark than what was previously available. Therefore, the parent pointer of $v_8$ has to be changed to make use of the new edge: $p_u[v_8]:=u$. Now that the path to the landmark from $v_8$ has improved, we have to recursively examine all neighbours of $v_8$ (i.e., $v_6$ and $v_7$) and check, whether switching their parent pointer to $v_8$ would improve their previously known path to the landmark. This is true both for $v_6$ and $v_7$, hence we set $p_u[v_6]:=v_8$, $p_u[v_7]:=v_8$. We repeat this again for all neighbours of $v_6$ and $v_7$. Having found no new path improvements, we complete the update.

The deletion of an edge involves two passes. Consider again FIG. 3 and suppose the edge $\{v_1,v_3\}$ was deleted from the graph. In order to find a new path to the landmark (and a new parent pointer) for $v_3$, we first examine its neighbours ($v_5$ and $v_6$). Unfortunately, both of them relied on $v_3$ for reaching the landmark, hence they provide no immediate fix. We record $v_3$ temporarily in a priority queue, using the best available new path length ($\infty$ so far) as the key. We then recursively descend to process the children of $v_3$ in the SPT. Vertex $v_5$ has no immediate fix and gets recorded in the priority queue with key $\infty$. Vertex $v_6$, however, can be connected to $v_4$, retaining a path to the landmark of length 3. Consequently, there is no need to process children of $v_6$. After reconnecting $v_6$ we must update the keys of its neighbours ($v_3$ and $v_5$) in the priority queue—the new potential path of length 4 is better than the previously recorded $\infty$. This completes the first pass. In the second pass we empty the priority queue, rebuilding the rest of the SPT.

We provide a more formal description of the update procedures in Algorithms 5 and 6.

In theory, a single update may trigger the SPT recomputation for the whole graph (e.g. deleting an edge that was a bridge between the landmark and all the other nodes). In practice, however, such situations are rare and, according to our experiments, the amortized time necessary to process a single update in a real Skype network is in the order of milliseconds.

Networks

The following are examples of real-world social network graphs, representing four different orders of magnitude in terms of network size.

DBLP. The DBLP dataset contains bibliographic information of computer science publications. Every vertex corresponds to an author. Two authors are connected by an edge if they have co-authored at least one publication.

Orkut. Orkut is a large social networking website. It is a graph, where each user corresponds to a vertex and each user-to-user connection is an edge.

Twitter. Twitter is a microblogging site, which allows users to follow each other, thus forming a network.

Skype. Skype is a large social network for peer-to-peer communication. We say that two users are connected by an edge if they are in each other's contact list.

The properties of these datasets are summarized in Table 1. The table shows the number of vertices |V|, number of edges |E|, average distance between vertices d (computed on a sample vertex pairs), approximate diameter $\Delta$, fraction of vertices in the largest connected component |S|/|V|, and average time to perform a BFS traversal over the graph $t_{BFS}$.

TABLE 1

Datasets.

| Dataset | |V| | |E| | d | $\Delta$ | |S|/|V| | $t_{BFS}$ |
|---|---|---|---|---|---|---|
| DBLP | 770K | 2.6M | 6.3 | 25 | 85% | 345 ms |
| Orkut | 3.1M | 117M | 5.7 | 10 | 100% | 8 sec |
| Twitter | 41.7M | 1.2B | 4.2 | 25 | 100% | 9 min |
| Skype | 454M | 3.1B | 6.7 | 60 | 85% | 20 min |

Comparative statements made herein concerning accuracy are stored as experiments using a random sample of SV vertex pair from each graph of the above datasets, and a parameter.

Approximation error is computed as (l'−l)/l, where l' is the approximation and l is the actual distance.

Suitable hardware is a server with 32× Quad-core AMD Opteron 64 bit 2.2 GHz processors, 256 G of RAM, accessing IBM DS 3400 FC SAN disk array, running Red Hat Enterprise Linux 5 operating system.

According to the above description, two improvements to existing approaches for landmark based estimation of shortest paths are described. The improvements strike a trade off between accuracy, query execution time and disc usage for pre-computed data. The pre-computed data refers to the data structure 22 which has to be generated and maintained for ready access in the search query. Improvements of up to 25% have been obtained with respect to previous related work, while maintaining the response time per query to a few miliseconds—even for a graph with billions of edges—and a space consumption of memory comparable to previous methods.

Moreover, an exclusive property of the methods described above is a support for dynamic updates.

The algorithms are being presented for the case of an undirected unweighted graph. The techniques can be generalised to weighted graphs by replacing the BFS in the SPT pre-computation phase and in the landmark-BFS algorithm with a Dijkstra traversal. The generalisation to directed graphs requires computing two shortest path trees for each landmark—the first one holding distances to the landmark, and the second one with distances from the landmark. The algorithms then need to be updated slightly to use both trees appropriately (for examples lines 4 and 5 of algorithm 3 will refer to two different trees rather than one).

Being a distance approximation scheme a landmark based algorithm can be used as a heuristic in a unidirectional or bidirectional A* search, as described for example in a paper by Goldberg et al published in 16$^{th}$ ACM—SIAM Symposium of Discrete Algorithms pages 156-165, 2005. In particular, this ability to efficiently estimate exact shortest paths allows us to take larger samples for best coverage landmark selection. Note that due to the incremental update capabilities of the above approach, the result is a fast fully dynamic exact shortest path algorithm.

In the approach described above, all landmarks are selected ex ante and the selection of landmarks is never revised. A further improvement can be obtained by using information collected during the processing of queries in order to add or remove landmarks. Each time a query is answered using the landmark-LCA algorithm, we can identify which landmarks are used and which specify vertices are used as LCAs. Based on the frequency of use of LCA's certain vertices can be promoted to become landmarks, or landmarks that are infrequently used can be dropped.

While this invention has been particularly shown and described with references to example embodiments thereof, it will be understood by those skilled in the art that various changes in form and details may be made therein without departing from the scope of the invention encompassed by the appended claims.

The invention claimed is:

1. A method of processing a search query to provide a search result, the method comprising
   receiving at a computer device a search query message, the search query message identifying a source node and a target node;
   responsive to receiving the search query message, accessing a data structure, wherein each landmark node identified within the data structure has stored therewith a shortest path tree in the form of a set of parent links, wherein each parent link identifies an adjacent vertex node;
   for each landmark node, identifying a location of the source node and a location of the target node in the shortest path trees to the landmark node;
   for each landmark node, generating a measure of distance between the source node and the target node based, at least in part, on said identified locations;
   determining the landmark node with the shortest distance; and
   providing a search result related to the shortest path tree of that landmark node,
   wherein generating a measure of distance comprises:
      identifying a common ancestor node in the shortest path trees from the source node and the target node to the landmark node;
      identifying all pairs of nodes in a first path between the source node and the common ancestor node and a second path between the common ancestor node and the target node;
      locating any of said pairs which are edges;
      identifying an edge of the shortest distance; and
      using the identified edge to determine the measure of distance between the source node and the target node.

2. A method according to claim 1, wherein providing a search result comprises displaying the search result to a user.

3. A method according to claim 1 wherein providing a search result comprises providing the search result to a search function configured to generate a comparison between a plurality of search results to provide a set of outputs in ranked order.

4. A method according to claim 1 wherein the search result comprises a list of node identifiers in the shortest path tree of the landmark with the shortest distance.

5. A method according to claim 1 wherein the search result comprises the number of nodes in the shortest path tree of the landmark for the shortest distance.

6. A computer device comprising:
   a first component comprising a data structure including information associated with at least one landmark node, each landmark node of the at least one landmark node having stored therewith a shortest path tree in the form of a set of parent links wherein each parent link identifies an adjacent vertex node in the shortest path between each node in the data structure and the landmark node: and
   a second component comprising a processor configured to execute a method for generating a search result, the method comprising:
      accessing the data structure effective to identify each landmark node of the at least one landmark node;
      for each identified landmark node, identifying the location of the source node and the target node in the shortest path trees to the landmark node;
      for each identified landmark node, using the identified locations of the target node and source node to generate a measure of distance between the source node and the target node;
      determining the landmark node of the at least one landmark node with the shortest distance; and
      providing a search result related to the shortest path tree of said determined landmark,
      wherein to generate a measure of distance, the second component is further configured to:
         identify a common ancestor node in the shortest path trees from the source node and the target node to the landmark node;

identify all pairs of nodes in a first path between the source node and the common ancestor node and a second path between the common ancestor node and the target node;
locate any of said pairs which are edges;
identify an edge of the shortest distance; and
use the identified edge to determine the measure of distance between the source node and the target node.

7. One or more computer-readable storage memory embodying processor-executable instructions which, responsive to execution by at least one processor, are configured to:
receive a search query identifying a source node and a target node;
responsive to receiving the search query, access a data structure effective to identify at least one landmark node within the data structure, wherein each landmark node identified within the data structure has stored therewith a shortest path tree in the form of a set of parent links, wherein each parent link identifies an adjacent vertex node:
identify, for each identified landmark node within the data structure, a location of the source node and the target node in the shortest path trees to said identified landmark node;
generate, for each identified landmark node within the data structure, a measure of distance between the source node and the target node based, at least in part, on said identified locations of the target node and source node;
determine, using each generated measure of distance, a landmark node with a shortest measure of distance; and
provide a search result based, at least in part, on the shortest path tree of said determined landmark node with the shortest measure of distance,
wherein the processor-executable instructions to generate a measure of distance are further configured to:
identify a common ancestor node in the shortest path trees from the source node and the target node to the landmark node;
identify all pairs of nodes in a first path between the source node and the common ancestor node and a second path between the common ancestor node and the target node;
locate any of said pairs which are edges;
identify an edge of the shortest distance; and
use the identified edge to determine the measure of distance between the source node and the target node.

8. The one or more computer-readable storage memory of claim 7, wherein the processor-executable instructions to generate, for each identified landmark node, a measure of distance, are further configured to:
compute a first distance using a shortest path between the source node and said identified landmark node;
compute a second distance using a shortest path between said identified landmark node and the target node; and
sum the first and second distances.

9. The one or more computer-readable storage memory of claim 7, wherein the processor-executable instructions to generate the measure of distance are further configured to:
identify a common ancestor node in the shortest path trees from the source node and the target node to the landmark node.

10. The one or more computer-readable storage memory of claim 9, the processor-executable instructions further configured to:
sum a first distance from the source node to the common ancestor node and a second distance from the common ancestor node to the target nodes to generate the measure of distance.

11. The one or more computer-readable storage memory of claim 7, wherein the processor-executable instructions to generate the measure of distance are further configured to:
record, for each identified landmark node, nodes in common between the shortest path trees from the source node and the target node to the identified landmark node;
execute, traversing only the commonly recorded nodes, a graph traversal from the source node to update a shortest path from the source node to the target node and use the updated shortest path to determine the measure of distance.

12. The one or more computer-readable storage memory of claim 7, wherein the processor-executable instructions to provide a search result are further configured to:
provide the search result to a search function, the search function configured to generate a comparison between a plurality of search results to provide a set of outputs in ranked order.

* * * * *